United States Patent

Steinberger et al.

[11] Patent Number: 5,707,153
[45] Date of Patent: Jan. 13, 1998

[54] BEARING ASSEMBLY WITH A CENTERING DEVICE AND A FLANGE

[75] Inventors: Wolfgang Steinberger; Manfred Winkler, both of Herzogenaurach, Germany

[73] Assignee: Ina Walzlager Schaeffler KG, Germany

[21] Appl. No.: 718,346

[22] PCT Filed: Mar. 30, 1995

[86] PCT No.: PCT/EP95/01179

§ 371 Date: Sep. 30, 1996

§ 102(e) Date: Sep. 30, 1996

[87] PCT Pub. No.: WO95/30849

PCT Pub. Date: Nov. 16, 1995

[30] Foreign Application Priority Data

May 9, 1994 [DE] Germany .......................... 44 16 319.2

[51] Int. Cl.⁶ .................. F16C 29/04; F16D 19/00
[52] U.S. Cl. .................. 384/49; 192/82 R; 192/110 B; 74/473 R; 384/51
[58] Field of Search .................. 384/49, 50, 51, 384/52, 59; 74/473 R; 192/82 R, 110 B

[56] References Cited

U.S. PATENT DOCUMENTS

| | | | |
|---|---|---|---|
| 4,544,212 | 10/1985 | Parzefall et al. | 74/473 R X |
| 5,140,866 | 8/1992 | Schetter et al. | 384/49 X |

FOREIGN PATENT DOCUMENTS

| | | | |
|---|---|---|---|
| 1041744 | 10/1958 | Germany | 384/49 |
| 4116823 | 11/1992 | Germany . | |
| 2601201 | 5/1993 | Germany . | |
| 4136988 | 5/1993 | Germany . | |
| 617221 | 2/1949 | United Kingdom | 384/49 |

*Primary Examiner*—Thomas R. Hannon
*Attorney, Agent, or Firm*—Bierman, Muserlian and Lucas LLP

[57] ABSTRACT

A bearing unit for linearly moving selector shafts in a toothed-wheel gearbox with rows of beating balls in a cage rolling on the one hand on an inner surface of a sleeve permanently fitted to the gearbox housing and on the other hand on the gear change shaft. The sleeve has a flange at one end by which the sleeve can be secured to a gearbox housing in such a way that it extends freely into the gearbox housing over its entire length.

11 Claims, 4 Drawing Sheets

BEARING ASSEMBLY WITH A CENTERING DEVICE AND A FLANGE

The invention concerns the arrangement of a bearing assembly for sliding selector shafts in a transmission casing, preferably for a gearshift device of a sliding multi-gear transmission comprising a rolling bearing (5) having rolls or bearing balls arranged in a cage (6) for rolling at least indirectly on a selector shaft and on an inner peripheral surface of a bushing (3) which is rigidly connected to the transmission casing (16).

Bearing assemblies of this type are normally mounted directly in a bore of the transmission casing. Due to the high switching forces caused by a relatively high friction, such a mounting arrangement influences the comfort of gearshifting. A bearing assembly of the aforesaid type known from DE-A 41 36 988, achieves a reduction of the frictional force by using a selector shaft mounted on a rolling bearing in the transmission casing. However, this prior art bearing assembly is unsuitable for selector shafts which, in addition to an already existing mounting arrangement, require a further mounting spaced in longitudinal direction from the said existing mounting. This is the case, for example, with selector shafts which are connected in the mounting regions to an actuating element such as a driver.

It is an object of the invention to create a mounting assembly for sliding shafts connected to an actuating element outside of the transmission casing, said mounting assembly causing less friction and increasing the comfort of gearshifting while at the same time requiring a small design space.

The invention achieves this object by the fact that on one end of the bushing, there is arranged a flange by which the bushing is fixed in or on the transmission casing so that an entire, or almost entire length of the bushing extends freely in the transmission casing. To create a sliding path limitation for the rolling bearing, an end stop is integrally formed on the end of the bushing remote from the flange. The rolling bearing assembly of the invention can be used as an additional mounting for the selector shaft in or on the transmission casing and can be arranged longitudinally away from the already existing mounting of the selector shaft, or it can replace the same. The bearing assembly of the invention permits a "floating" mounting of the selector shaft since this is not supported directly on the transmission casing. The mounting arrangement which extends in axial direction requires only a small radial design space and is therefore advantageously suited for use in confined installation conditions.

In one embodiment, on its side facing the transmission casing, the flange comprises a centering device. The side of the flange opposite to the centering device merges integrally into the bushing.

In a further embodiment of the invention, the flange is configured so as to bear by an even surface against the transmission casing, and centering is effected by fitting pins or screws which are used for fixing the flange.

To form an end stop for the rolling bearing in the bushing, the end of the bushing remote from the flange is shaped radially inwards without chip removal to form a step against which the rolling bearing bears by an outer ring.

In a further advantageous embodiment of the invention, the flange and the bushing are made together as a single integrally formed component which can be advantageously manufactured economically by a non-chipping procedure, particularly by deep drawing. In an alternative embodiment of the invention, the flange and the bushing are separate elements joined together undetachably, for example, by welding or soldering to form a single component.

The rolling bearing is positionally fixed and surrounds the shaft through an angle of about 180°. Such a bearing is particularly suitable for stepped shafts or shaft sections which comprise recesses, for instance for engagement by driving elements.

Embodiments may concern anti-rotation devices which enable an exact positional fixing of the rolling bearing of the alcove embodiment.

In one embodiment, the cage comprises a pin which is guided in an axial groove of the bushing. In a further embodiment, the bushing comprises a longitudinal groove for every rolling element of the rolling bearing so that the rolling elements, and consequently, the rolling bearing too, are positionally fixed in the longitudinal grooves. An alternative anti-rotation device is obtained by providing a longitudinal groove for only one or two rolling elements. In another embodiment, an anti-rotation device is obtained by having the end rolling elements of the rolling bearing bear against a shoulder of the bushing.

In another embodiment, the bearing assembly of the invention can be advantageously combined with a locking device for the sliding selector shaft.

Examples of embodiment of the invention are represented in the drawings and will be described more closely below. The drawings show:

FIG. 1, a bearing assembly of the invention in a longitudinal cross-section;

FIG. 2, a detail of a housing of a bearing assembly of the invention;

FIG. 3, an alternative to FIG. 2;

FIG. 4, a side view of a bearing assembly of the invention in which the rolling bearing cage comprises an anti-rotation device in the housing;

FIG. 5, a view of a bearing assembly corresponding to FIG. 4, in which the rolling elements are guided in a longitudinal groove;

FIG. 6, a view of a bearing assembly corresponding to FIG. 4, in which the anti-rotation device is constituted by the end rolling elements;

FIG. 7, a bearing assembly of the invention in the installed state.

The structure of a bearing assembly 1 of the invention in which a shaft 2 is mounted for sliding displacement will first be explained with reference to FIG. 1. The bearing assembly 1 comprises a substantially cylindrical bushing 3 and a flange 4. Inserted into the bushing 3 is a rolling bearing 5 whose cage 6 comprises a radially outward pointing pin 7 which engages into an axial groove 8 of the bushing 3 to form an anti-rotation device 9. An axial displacement of the shaft 2 causes a displacement of the rolling bearing 5 whose maximum displacement is determined by the axial groove 8. The bushing 3 and the flange 4 are formed integrally in one piece out of sheet metal without chip removal and constitute a housing which at its flange-proximate end comprises a double-backed portion 10 extending over half the periphery of the bushing 3 and constituting a centering device 11 by which the bearing assembly 1 can be centered in the installed state. For fixing the bearing assembly 1 on a transmission casing, the flange 4 comprises bores 12 for screw connections. The end of the bushing 3 remote from the flange 4 comprises a radially inward oriented step 21 which serves as a sliding path limitation for the rolling bearing 5. The same purpose is served at the opposite end of the bushing 3 by a fold 13 which extends over half the periphery of the bore. The end of the shaft 2 situated away from the flange 4 and projecting out of the bearing assembly 1 is connected to a driving element, not shown in FIG. 1.

As an alternative to FIG. 1, a housing comprised of two separate elements is shown in FIG. 2. The likewise chiplessly formed bushing 3a is undetachably connected to the flange 4a, for example by welding. In contrast to the bushing 3 of FIG. 1, the bushing 3a comprises an inwards oriented fold 13 which forms a sliding path limitation for the rolling bearing.

Figure 1:
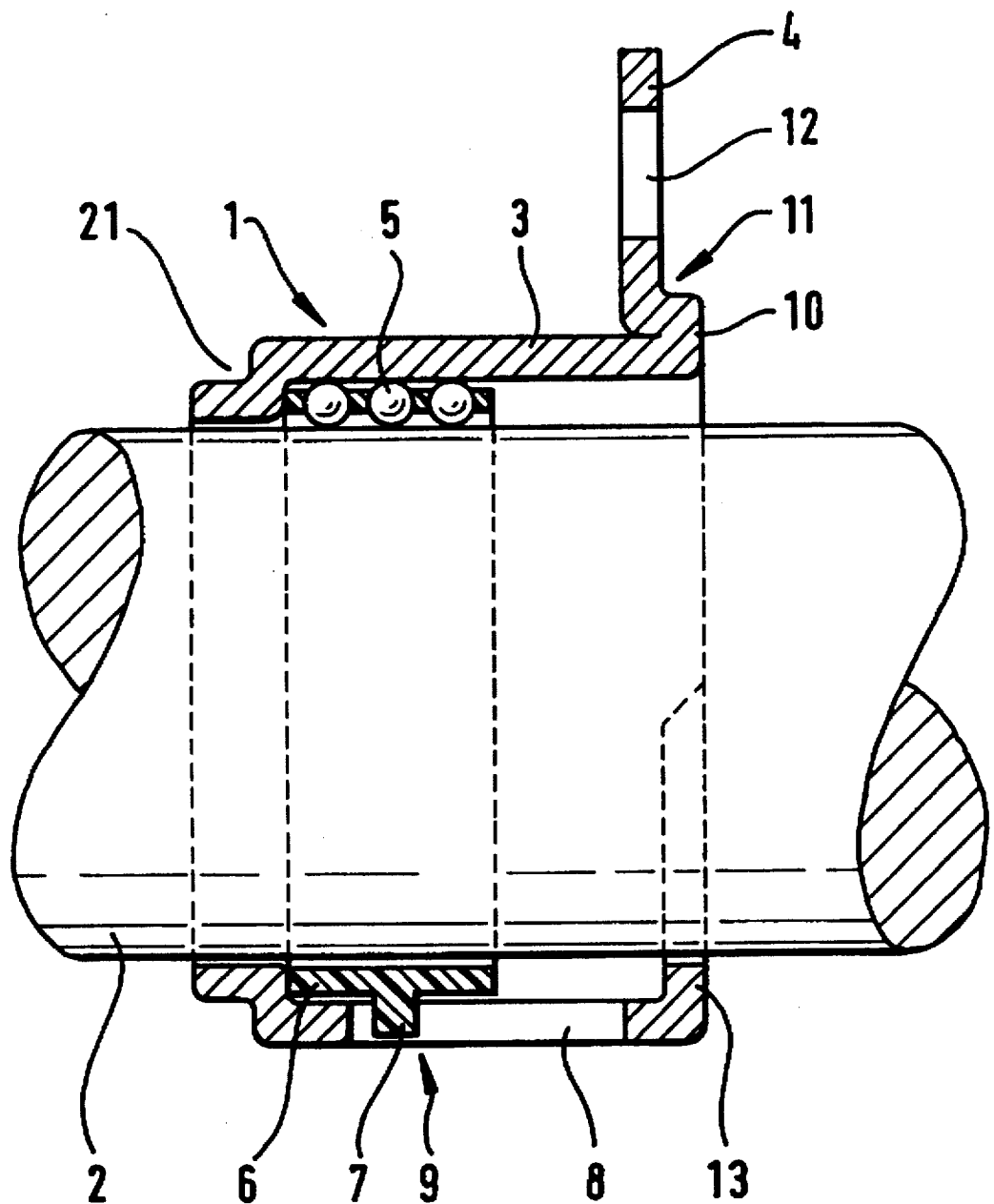
Figure 4:
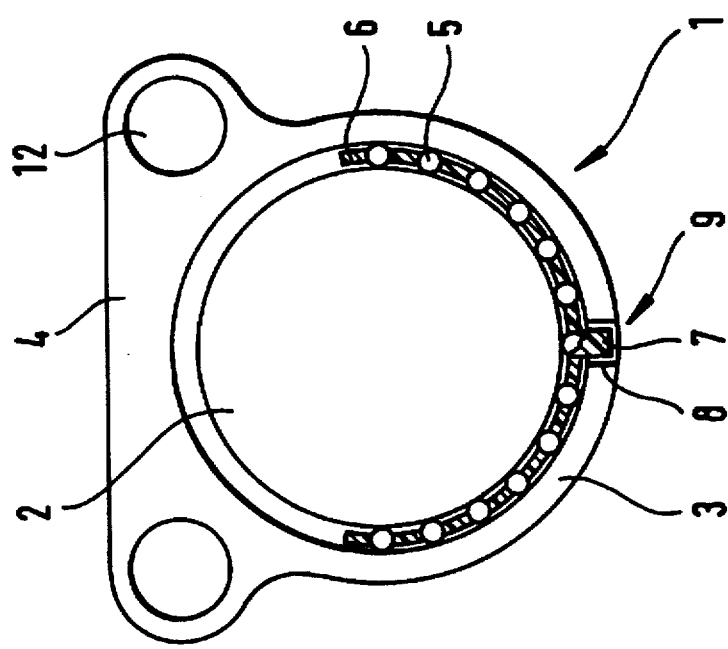
FIGS. 4 to 6 are side views of the bearing assembly 1 of FIG. 1, each one showing a differently configured anti-rotation device.
Figure 3:
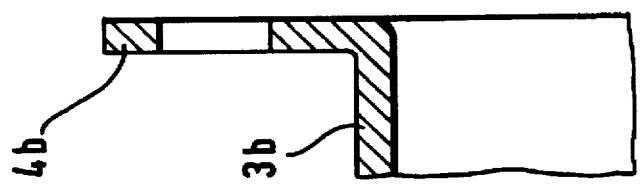
FIG. 3 shows a housing which bears by an even surface against the wall of the transmission casing. To achieve this, the bushing 3b and the flange 4b are made in one piece with each other.
Figure 2:
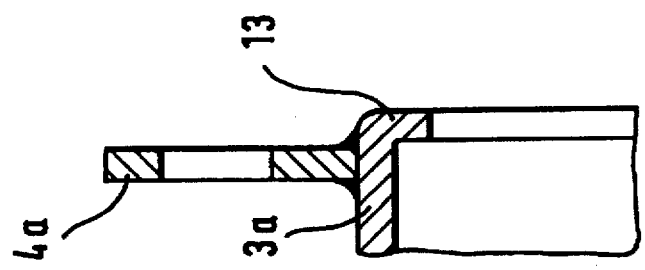
Figure 6:
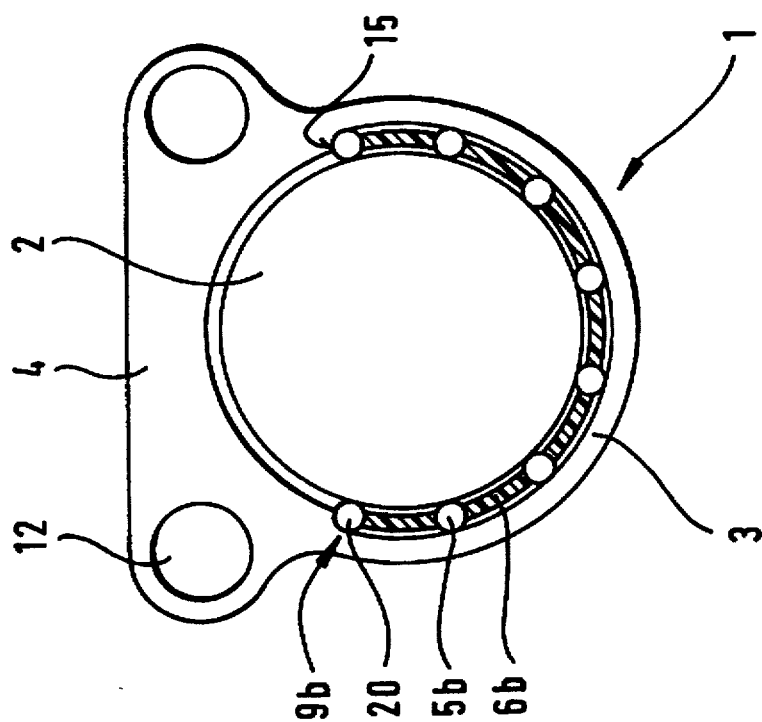
Figure 5:
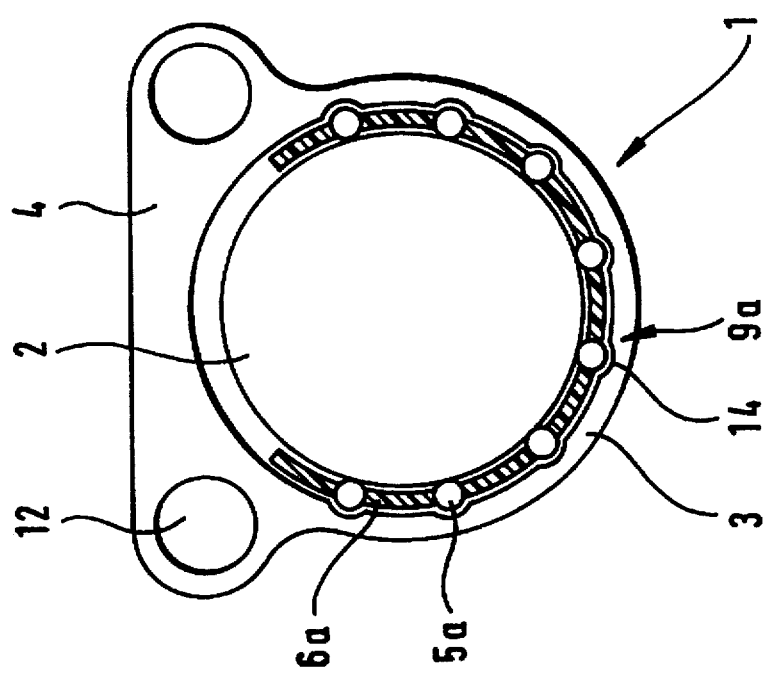

FIG. 4 shows the anti-rotation device 9 of FIG. 1 in a side view. The anti-rotation device 9a shown in FIG. 5 comprises longitudinal grooves 14 made in the bushing 3 for guiding the rolling elements of the rolling bearing 5a. In contrast to the rolling bearing 5 of FIG. 4, the rolling bearing 5a surrounds the shaft 2 but for an angle of approximately 90° between the ends of the cage 6a. The anti-rotation device of 9b of FIG. 6 is a further variant in which the rolling elements 20 arranged on the free ends of the rolling bearing 5b bear against a shoulder 15 of the bushing 3.

Figure 7:
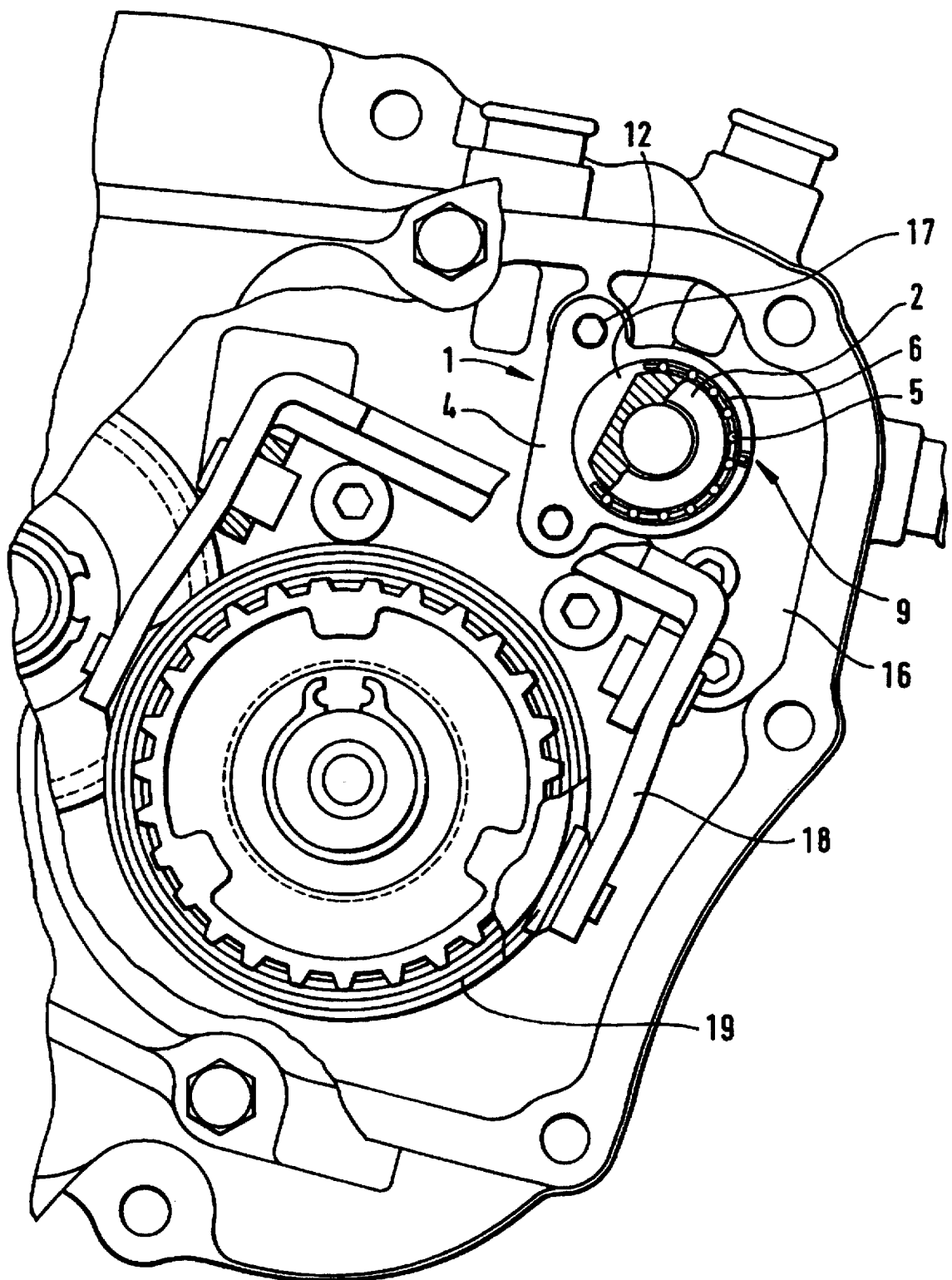

FIG. 7 shows the bearing assembly 1 in the installed state i.e., flange-fitted on an end wall of a transmission casing 16. In addition to structural details of the bearing assembly which correspond to those of the bearing assembly 1 of FIG. 1, FIG. 7 also shows the stepped portion 17 of the shaft 2 with which a driving element 18 is interlocked for the actuation of a synchronizer sleeve 19.

We claim:

1. A bearing assembly arrangement for sliding selector shafts in a transmission casing (16) of a sliding multi-gear transmission comprising a rolling bearing (5) having rows of bearing balls arranged in a cage (6) for rolling at least indirectly on a selector shaft and on an inner peripheral surface of a bushing (3) which is rigidly connected to the transmission casing (16), characterized in that on one end of the bushing (3, 3a, 3b), there is arranged a flange (4, 4a, 4b) by which the bushing (3, 3a, 3b) is fixed in or on the transmission casing (16) so that an entire, or almost entire length of the bushing (3, 3a, 3b) extends freely, and an end stop for the rolling bearing (5) is integrally formed on an end of the bushing (3, 3a, 3b) remote from the flange (4, 4a, 4b).

2. A bearing assembly arrangement of claim 1 wherein the flange (4) comprises a centering device (11) oriented towards the transmission casing (16), and the bushing (3) is a directional bushing which starts from the flange (4).

3. A bearing assembly arrangement of claim 2 wherein the end stop formed on the bushing (3) is configured as a step (21).

4. A bearing assembly arrangement of claim 2 wherein the flange (4b) and the bushing (3b) are made together as a single integrally formed component by a non-chipping procedure.

5. A bearing assembly arrangement of claim 2 wherein the flange (4a) and the bushing (3b) are undetachably connected to each other by a welded or soldered joint.

6. A bearing assembly arrangement of claim 1 wherein the flange (4) is configured so as to bear by an even surface against the transmission casing (16).

7. A bearing assembly arrangement of claim 1 wherein the rolling bearing (5) surrounds the shaft (2) through an angle of about 180° and is arranged secure against rotation in the bushing (3).

8. A bearing assembly arrangement of claim 7 wherein the rolling bearing (5) comprises an anti-rotation device (9) constituted by a pin (7) arranged on the cage (6) of the rolling bearing (5) and guided in an axial groove (8) of the bushing (3).

9. A bearing assembly arrangement of claim 7 wherein an anti-rotation device (9a) is constituted by rolling elements of the rolling bearing (5a) in the form of balls which are guided in at least one longitudinal groove (14) of the bushing (3).

10. A bearing assembly arrangement of claim 7 wherein an anti-rotation device (9b) is constituted exclusively by end rolling elements (20) or by the cage (6) of the rolling bearing (5b) which bear against a shoulder (15) of the bushing (3).

11. A bearing assembly arrangement of claim 1 wherein the bearing assembly (1) is connected to a locking device which is connected to the shaft (2).

* * * * *